United States Patent
Voges et al.

[19]

[11] Patent Number: 5,971,500
[45] Date of Patent: Oct. 26, 1999

[54] ELECTRONICALLY ADJUSTABLE BRAKE SYSTEM FOR MOTOR VEHICLES

[75] Inventors: Dieter Voges, Koblenz/Kesselheim; Frank Lubischer, Boppard-Udenhausen, both of Germany

[73] Assignee: Lucas Industries public limited company, United Kingdom

[21] Appl. No.: 09/068,681

[22] PCT Filed: Oct. 28, 1996

[86] PCT No.: PCT/EP96/04685

§ 371 Date: May 13, 1998

§ 102(e) Date: May 13, 1998

[87] PCT Pub. No.: WO97/18114

PCT Pub. Date: May 22, 1997

[30] Foreign Application Priority Data

Nov. 15, 1995 [DE] Germany ............ 195 42 654

[51] Int. Cl.⁶ .............. B60T 8/40; B60T 17/02
[52] U.S. Cl. ............ 303/113.4; 188/356; 188/358; 303/114.1; 303/114.3; 303/116.1; 303/DIG. 4; 303/10
[58] Field of Search ............ 303/113.4, 114.3, 303/155, DIG. 3, DIG. 4, 10–12, 13–15, 116.1, 113.3, 113.2, 114.1, 116.4, 119.1; 188/356, 357, 359, 360, 156, 158, 358

[56] References Cited

U.S. PATENT DOCUMENTS

| 3,840,087 | 10/1974 | Von Loewis et al. | 303/10 |
|---|---|---|---|
| 5,547,266 | 8/1996 | Beck et al. | 303/116.1 |
| 5,704,694 | 1/1998 | Kozakai | 303/114.3 |
| 5,855,420 | 1/1999 | Lawrence | 303/113.4 |

FOREIGN PATENT DOCUMENTS

| 268440 | 5/1988 | European Pat. Off. . |
|---|---|---|
| 2219468 | 10/1973 | Germany . |
| 3219133 | 11/1983 | Germany . |
| 3623392 | 2/1987 | Germany . |
| 3737726 | 5/1989 | Germany . |
| 4055154 | 2/1992 | Japan . |
| WO 90/04530 | 5/1990 | WIPO . |
| WO 91/05688 | 5/1991 | WIPO . |
| WO 9531362 | 11/1995 | WIPO . |

*Primary Examiner*—Douglas C. Butler
*Attorney, Agent, or Firm*—MacMillan Sobanski & Todd, LLC

[57] ABSTRACT

The invention relates to an electronically controllable braking system for motor vehicles with a brake pressure generator unit (2) which can be actuated by a brake pedal (1), which supplies hydraulic fluid via a hydraulic fluid path (3) to at least one wheel brake (4) of the motor vehicle, a first electromagnetic valve arrangement (5a, 5b) which is arranged in the hydraulic fluid path between the brake pressure generator unit (2) and the wheel brake (4) for controlling the pressure build-up, pressure relief and pressure holding phases in the wheel brake, a motor-powered controllable hydraulic pressure source (7) which, in addition to or in lieu of the brake pressure generator unit (2), supplies hydraulic fluid to the wheel brake (4), and a motor-powered controllable auxiliary energy source (15, 30) which boosts an actuation of the brake pressure generator unit (2) by the brake pedal (1) or which effects an actuation of the brake pressure generator unit (2) in lieu of the brake pedal (1), with the controllable auxiliary energy source (15, 30) and the controllable hydraulic pressure source (7) being driven by the same motor (8) and being continuously connected with same via a gear mechanism (8a, 7a, 15a, 30a).

22 Claims, 3 Drawing Sheets

ELECTRONICALLY ADJUSTABLE BRAKE SYSTEM FOR MOTOR VEHICLES

The present invention relates to an electronically controllable braking system for motor vehicles with a brake pressure generator unit which can be actuated by a brake pedal, which supplies hydraulic fluid via a hydraulic fluid path to at least one wheel brake of the motor vehicle, a first electromagnetic valve arrangement which is arranged in the hydraulic fluid path between the brake pressure generator and the wheel brake for controlling the pressure build-up, pressure relief and pressure holding phases in the wheel brake, a motor-powered controllable hydraulic pressure source which, in addition to or in lieu of the brake pressure generator, supplies hydraulic fluid to the wheel brake.

From DE 32 19 133 A1 a similar arrangement is known wherein an electric motor for driving a fan of a motor vehicle is additionally employed as the drive of a pump which charges a pressure accumulator for the supply of an auxiliary braking system. The electric motor can additionally be turned on by means of a pressure switch which monitors the accumulator pressure of the pressure accumulator. Moreover, the drive shaft of the electric motor can be coupled to the pump via electromagnetically operable clutches and decoupled from the fan when the pressure accumulator is being charged.

The problem with this arrangement is that the electric motor for driving the fan, for example of a cooling means of the motor vehicle, is usually arranged at a considerable distance from the vehicle braking system so that relatively long pressure lines have to be routed from the pump coupled with the electric motor to the vehicle braking system. Moreover, the two electromagnetically operable clutches are complicated and vulnerable under operating conditions so that the solution as proposed therein is only conditionally suited for a large-scale application under safety and cost aspects.

Nevertheless, there is a demand for a compact and simultaneously safe and economic possibility for a multiple ultilisation of electrical systems which exist in a motor vehicle.

To this end, the invention proposes a motor-powered controllable auxiliary energy source which boosts an actuation of the brake pressure generator by the brake pedal or which effects an actuation of the brake pressure generator in lieu of the brake pedal, with the controllable auxiliary energy source and the controllable hydraulic pressure source being driven by the same motor and being continuously functionally connected with same.

The use of a common motor for the controllable hydraulic source and the controllable auxiliary energy source ensures that long line routings are avoided. Due to the continuous connection via a gear mechanism between the common motor for the controllable hydraulic pressure source and the controllable auxiliary energy source the failure-prone and complicated electromagnetic clutches are omitted.

According to a first embodiment the controllable auxiliary energy source is a pneumatic pump which acts upon a pneumatic brake booster which is coupled with the brake pressure generator. The pneumatic pump may be both an overpressure and a vacuum pump. Depending on whether the pneumatic pump is an overpressure or a vacuum pump, feeding of the auxiliary energy into the pneumatic brake booster is effected into the vacuum chamber or the atmospheric chamber.

The pneumatic pump is preferably a vacuum pump which takes the place of a connection to an intake pipe of an Otto engine.

Preferably, a second controllable valve arrangement is provided between the pneumatic pump and the brake booster by means of which—under the control of an electronic control unit—an actuation of the brake pressure generator can be boosted or an actuation of the brake pressure generator in lieu of the brake pedal can be effected. According to a particularly preferred embodiment the pneumatic pump is either connected with the brake booster, or an inlet and an outlet side of the pneumatic pump can be brought to approximately the same pressure level, depending on the position of the second valve arrangement. In the latter case the pump is, for example, connected with the ambient atmosphere both on the inlet side and on the outlet side. The consequence of this is that the pump runs virtually load-free so that the energy consumption of the motor is considerably reduced.

Depending on a valve position of the first valve arrangement, an inlet and an outlet side of the controllable hydraulic pressure source can be brought to approximately the same pressure level in a corresponding manner for the controllable hydraulic pressure source of a particularly preferred embodiment of the invention. This means that—again under the control of the electronic control means—the motor is hardly loaded by the operation of the hydraulic pressure source if the inlet and outlet of same are at an identical pressure level, i.e. the inlet and the outlet are virtually connected.

According to a further embodiment of the invention the controllable auxiliary energy source is a hydraulic pump which acts upon a cylinder/piston arrangement which is coupled with the brake pressure generator.

In this case, too, a second controllable valve arrangement is provided between the hydraulic pump and the cylinder/piston arrangement for a dedicated boosting of a brake pedal actuation or for a dedicated replacement of a brake pedal actuation, respectively.

In the same manner as in the first embodiment, the hydraulic pump is connected either with the cylinder/piston arrangement, or an inlet side and an outlet side of the hydraulic pump can be brought to approximately the same pressure level, depending on the position of the second valve arrangement.

In order to ensure high actuation dynamic properties of the brake pressure generator unit by means of the cylinder/piston arrangement, the hydraulic pump of a preferred embodiment can be connected with a pressure accumulator, with the pressure accumulator and/or the hydraulic pump being connectable in a controlled manner with the cylinder/piston arrangement through a third valve arrangement. It is thereby achieved that with an electronically controlled actuation of the hydraulic pump a slowly building up pressure can be supplemented by the pressure in the pressure accumulator so that the actuation of the cylinder/piston arrangement can be effected at high speed.

The pressure generator unit preferably comprises a pressure chamber which can be connected via a first valve arrangement with at least one wheel brake, and at least a second pressure chamber which can be connected with the hydraulic pump and/or the pressure accumulator for the second and/or the third valve arrangement. The first and the second pressure chamber are preferably separated by a piston upon which the brake pedal acts in the case of a normal actuation. The consequence of this is that an expansion of the second pressure chamber and the supply of hydraulic fluid from the hydraulic pump reduce the volume of the first pressure chamber. This means that hydraulic fluid from the first pressure chamber is fed into the wheel brake.

The output shaft of the motor and the two drive shafts of the hydraulic pump and of the pneumatic pump are preferably arranged coaxially to each other and rigidly connected with each other. This ensures a very compact construction of the entire arrangement and an easy assembly. Depending on the dimensioning of the individual pumps or of the motor, respectively, a step-up gear or a step-down gear may be arranged between the motor and the respective pump.

The pneumatic pump is preferably a vacuum pump which is designed as a vane-cell pump, while the hydraulic pump is preferably a pressure pump which, in particular, is designed as a radial piston pump or as an axial piston pump.

Further properties, characteristics and advantages of the invention will be explained by means of the following description of the figures, in which.

Figure 1:
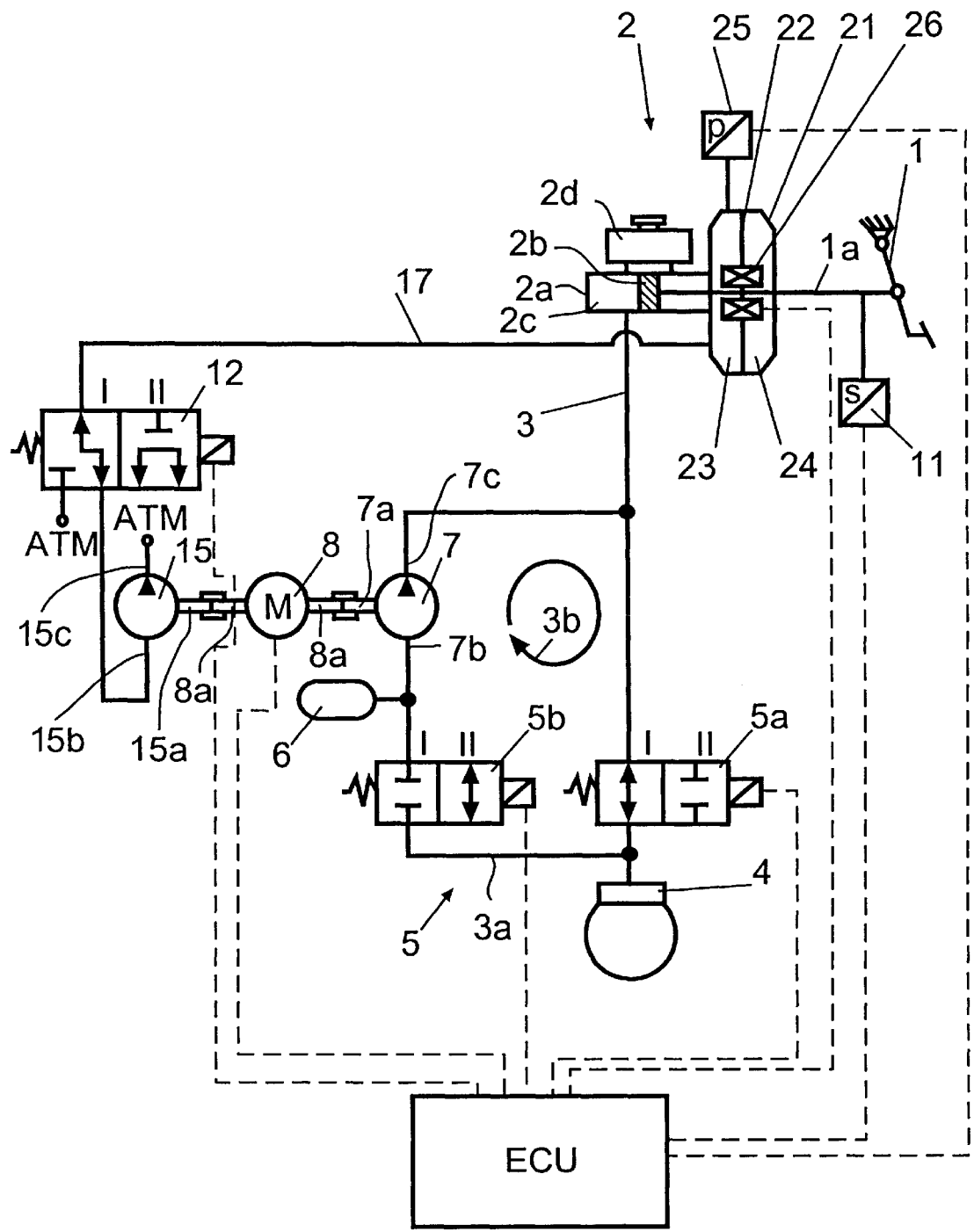
FIG. 1 shows a schematic representation of a first embodiment of an inventive electronically controllable braking system for motor vehicles.

FIG. 1 shows a first embodiment of an inventive electronically controllable braking system for motor vehicles. A brake pedal 1 serves to actuate a brake pressure generator unit 2 via an actuation rod 1a. The brake pressure generator unit 2 comprises a cylinder/piston arrangement 2a, 2b which forms a first pressure chamber 2c. The pressure chamber 2c is supplied from a hydraulic fluid reservoir 2d. A hydraulic line 3 leads from the pressure chamber 2c to a wheel brake 4 of the motor vehicle.

A first electromagnetic valve arrangement 5a, 5b is arranged in the hydraulic line 3 between the brake pressure generator unit and the wheel brake in order to control pressure build-up, pressure relief and/or pressure holding phases in the wheel brake. The first electromagnet arrangement 5a, 5b is formed by two electromagnetic valves 5a, 5b each of which can be driven by an electronic control unit ECU. In the electrically non-actuated condition the one electromagnetic valve 5a is open and the second electromagnetic valve 5b is closed in order to enable a pressure build-up in the wheel brake 4. If only the electromagnetic valve 5a is actuated, the second electromagnetic valve 5b remains closed and the first electromagnetic valve 5a, too, goes into its closed position so that the pressure in the wheel brake is maintained constant. If both the first and the second electromagnetic valve 5a, 5b are actuated the first electromagnetic valve 5a goes into its closed position while the second electromagnetic valve 5b goes into its open position. In this case, hydraulic fluid from the wheel brake 4 can flow off the wheel brake 4 via a hydraulic line 3a through the second electromagnetic valve 5b into a hydraulic intermediate reservoir 6. The brake fluid in the hydraulic intermediate reservoir is returned into the brake line 3 via a hydraulic pressure source in the form of a hydraulic pump 7. The hydraulic pump 7 is actuated by an electric motor 8 which is also controlled by the electronic control unit ECU. The first electromagnetic valve arrangement 5a, 5b can also be designed as a mechanical volume controlling valve instead of the first electromagnetic valve 5a or with a 3/2-way valve instead of both electromagnetic valves 5a, 5b.

The brake pressure generator unit 2 comprises a pneumatic brake booster 21 for the amplification of the actuation force which is introduced via the brake pedal 1. A movable wall 22 divides the pneumatic brake booster 21 into a vacuum chamber 23 and a pressure chamber 24. For the generation of the vacuum the vacuum chamber 23 is connected via a line 17 with an auxiliary energy source which is designed as a vacuum pump 15 and which together with the hydraulic pump 7 is driven by the electric motor 8. A pressure sensor arrangement 25 senses the vacuum in the vacuum chamber 23 and supplies a corresponding signal which reflects the currently prevailing pressure to the electronic control unit ECU. In the case of an insufficient vacuum the electric motor 8 is actuated under the control of the electronic control unit ECU so that the pump increases the vacuum in the vacuum chamber 23. As an alternative to the control of the motor 8 by the electronic control unit ECU, the pressure sensor arrangement 25 can also be designed as a simple pressure switch for turning the electric motor 8 on/off.

The brake booster 21 is also electrically controllable via an electromagnet arrangement 26 so that braking operations can also be carried out regardless of an actuation of the brake pedal 1. This serves, for example, for the performance of an antislip control or a driving dynamics control. In addition, a sensor means 11 for sensing a parameter (pedal travel, pedal force, pedal actuation speed) which is related with the actuation of the brake pedal is provided to carry out braking operations in emergency situations as well, e.g. upon exceeding a certain pedal actuation speed or as a function of vehicle-to-vehicle ranging radar measurements.

The generation of the vacuum via an additional vacuum pump is necessary for motor vehicles whose driving engines do not generate any vacuum or an inadequate vacuum. This applies, for example, to electric vehicles or to Diesel vehicles. But also in the case of vehicles with Otto engines where the Otto engine provides a vacuum which is sufficient for normal operation, the employment of an additional vacuum pump according to the invention offers advantages. In an antislip control, for example, where a hydraulic pressure is built up in the wheel brake 4 without actuation of the brake pedal 1 but by the electrically controlled brake booster 21, the case may occur that the accelerator pedal is actuated simultaneously and thus the throttle valve is open. In this case the vacuum generated by the Otto engine may no longer be sufficient under all operating conditions to generate the necessary vacuum for the actuation of the brake pressure generator unit 2.

Moreover, a controllable auxiliary energy source according to the invention enables the build-up of a higher pressure difference in the pneumatic brake booster than is the case with respect to the pressure difference between the atmospheric pressure and the suction pressure of an Otto engine. The consequence of this is that either a higher braking dynamics can be achieved or a smaller brake booster can be used. The latter can result in significant space savings.

The electric motor 8 has an output shaft 8a. The hydraulic pump 7 has a drive shaft 7a and the pneumatic pump 15 has a drive shaft 15a. The output shaft 8a and the two drive shafts 7a, 15a are aligned coaxially relative to each other and rigidly coupled with one another. In order to reduce the loading of the electric motor the vacuum pump 15 can also be operated load-free. For this purpose an electromagnetically operated change-over valve 12 which can be controlled by the electronic control unit ECU is provided in the line 17, the actuation of which enables the intake side 15b of the pneumatic pump 15 to be subjected to atmospheric pressure. For this purpose the electromagnetic valve 12 is brought into the actuated position II. The consequence of this is that no pressure difference exists between the intake side 15b and the outlet side 15c of the pneumatic pump 15. For example, with an antilock system the total power of the electric motor is available for the hydraulic pump 7. In the normal case, a vacuum is generated by the pneumatic pump 15 with the brake pedal 1 not actuated or upon release of the brake pedal 1, respectively, so that no hydraulic pressure prevails in the hydraulic line 3 and the hydraulic pump 7 is operated nearly load-free. Virtually the total power of the electric motor 8 is available for the pneumatic pump 15. For the load-free operation of the hydraulic pump 7 there is also the possibility to bring the electromagnetic valve 5b into its actuated position II while the electromagnetic valve 5a remains in its non-actuated position I so that hydraulic fluid is pumped in the circuit 3b via the brake lines 3a.

Due to the fact that the power demand for the operation of the pneumatic pump 15 is lower than the power demand of the hydraulic pump 7, the operation of the electric motor 8 can be effected with a correspondingly adapted speed. This means that during the generation of a vacuum by means of the pneumatic pump 15 a lower speed is adjusted than during the return delivery by the hydraulic pump 7 in the case of an antilock control. This is also advantageous in that during the operation of the pneumatic pump 15 the generation of noise is reduced and less electrical energy is required.

In the following description of the embodiment according to FIG. 2 components which have not been changed with respect to FIG. 1 or corresponding components are identified by the same reference numerals as in FIG. 1.

Figure 2:
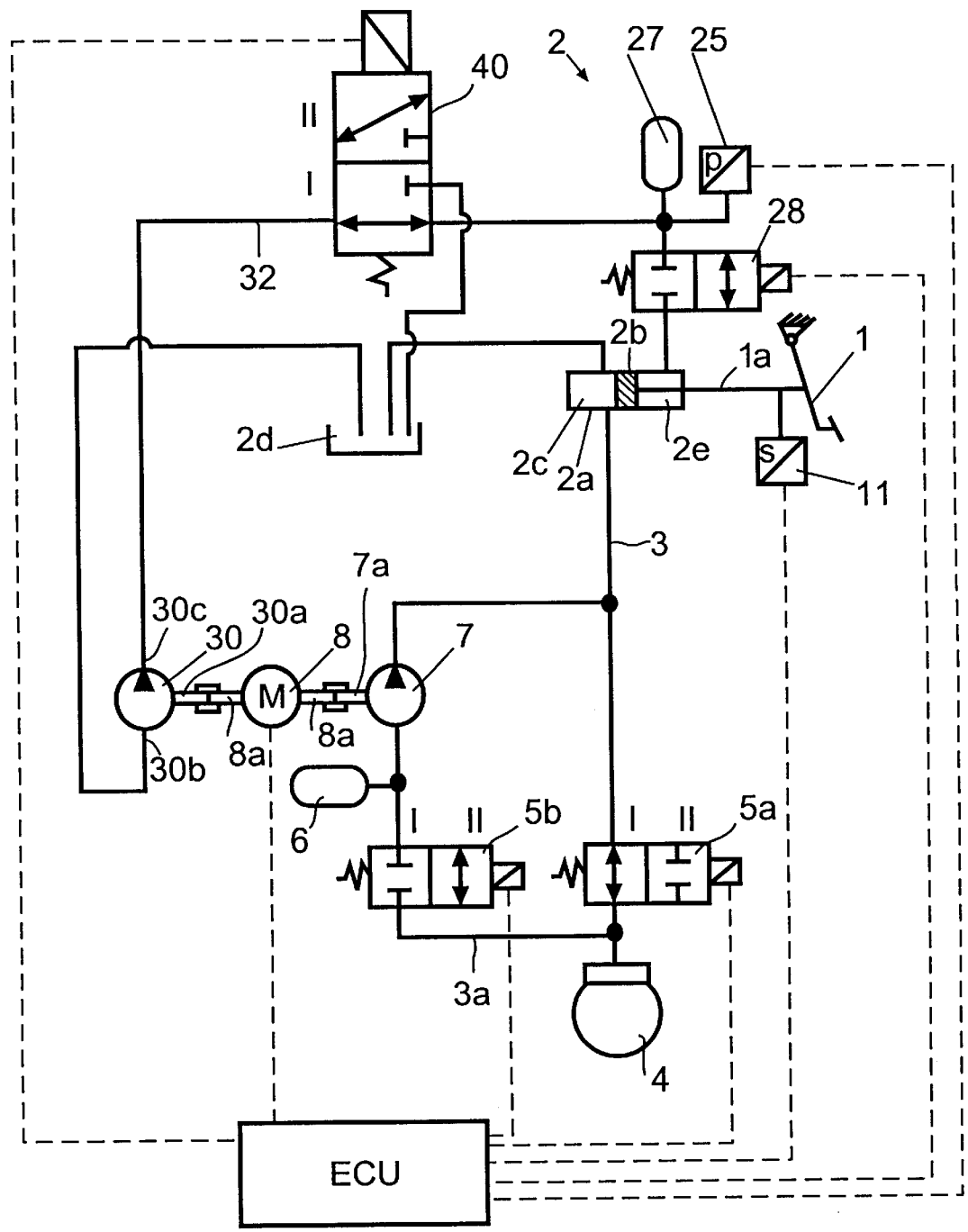
FIG. 2 shows a schematic representation of a second embodiment of an inventive electronically controllable braking system for motor vehicles.

In the second embodiment of an inventive vehicle braking system which is schematically shown in FIG. 2, the brake pressure generator unit 2 comprises a second pressure chamber 2e for boosting the actuating force which is introduced by the brake pedal 1, which can be subjected with brake fluid from the pressure accumulator 37 upon an electrical actuation of an electromagnetic valve 28. In the electrically non-actuated condition the electromagnetic valve 28 blocks the connection between the pressure accumulator 27 and the second pressure chamber 2e of the brake pressure generator unit 2.

Such an arrangement for boosting the actuation force is also referred to as a "hydraulic booster" and can also serve to initiate automatic braking operations, i.e. independent of an actuation of the brake pedal 1. Due to the fact that the actuation of the brake pedal 1 is electrically sensed by means of a sensor means 11, a system of this type can also be employed by a so-called "brake-by-wire" system, with a hydraulic emergency braking system ("push-through" system) being provided by the mechanical connection of the brake pedal 1 with the brake pressure generator unit 2. The pneumatic pump 15 from FIG. 1 is replaced here by a hydraulic pump 30 which serves to provide the pressure accumulator 27 with pressure.

The pressure prevailing in the pressure accumulator 27 is sensed by means of a pressure sensor arrangement 25 in order to effect a recharging by the hydraulic pump 30 if the pressure falls below a predetermined limit. For this purpose the pump 30 draws in hydraulic fluid from the hydraulic fluid reservoir 2d in order to deliver the hydraulic fluid via a line 32 into the pressure accumulator 27.

In this case, too, the hydraulic pump 30 is coupled with the hydraulic pump 7 of the pressure modulation means via a gear mechanism so that both pumps 30, 7 are simultaneously driven by the electric motor 8. In order to enable the hydraulic pump 30 to be operated under idling conditions, i.e. to have the pressure intake side 30b and the pressure outlet side 30c at the same pressure level, a third electromagnetic valve 40 which can be controlled by the electronic control unit ECU is arranged in the hydraulic line 32 between the pressure outlet side 30c and the electromagnetic valve 28.

The electromagnetic valve 40 is designed as a changeover valve which in its shown first position I connects the hydraulic pump 30 with the electromagnetic valve 28 or with the pressure accumulator 27, while it connects the pressure intake side and the pressure outlet side of the hydraulic pump 30 with the hydraulic fluid reservoir 2d in the actuated second position II. In this second actuated position II the pressure accumulator 27 is also blocked against the hydraulic pump 30.

Otherwise the embodiment according to FIG. 2 corresponds to the embodiment according to FIG. 1 with respect to its construction and function so that a further detailed description can be dispensed with.

Figure 3A:
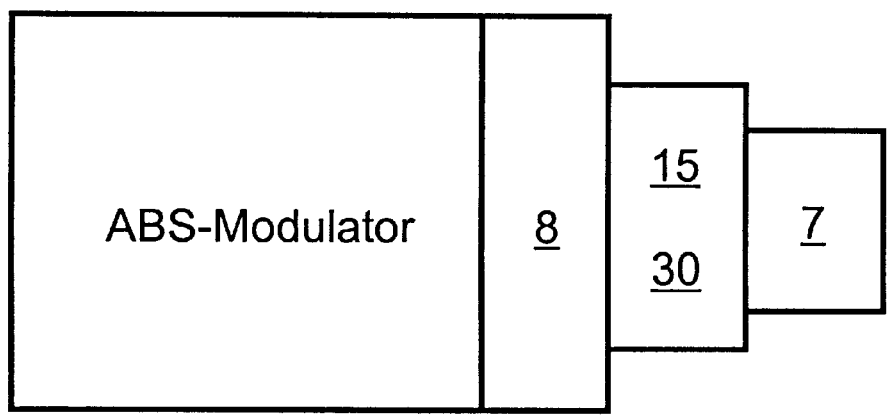
FIGS. 3a, 3b show two embodiments of possible combinations of the motor, the hydraulic pressure source and the auxiliary energy source within a vehicle braking system.
Figure 3B:
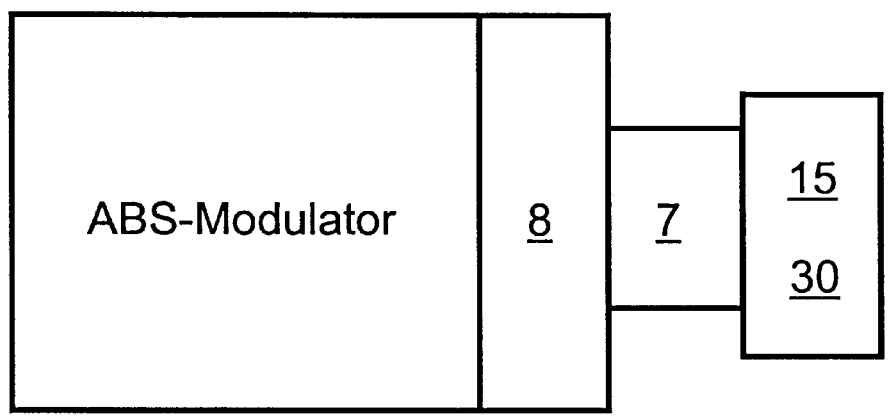

FIGS. 3a and 3b schematically show a possibility for an installation space saving integration of the additional vacuum pump 15 or of the additional hydraulic pump 30, respectively, into an existing antilock system. Here, the term ABS modulator refers to a construction unit which comprises the valve means 5, the pressure accumulator 6 as well as the hydraulic pump 7 for all wheel brakes 4 of the vehicle, which is driven by the electric motor 8. In the embodiment according to FIG. 3a the additional pneumatic or hydraulic, respectively, pump 15, 30 is arranged between the electric motor 8 and the hydraulic pump 7, while in the embodiment according to FIG. 3b the additional pump 15, 30 is arranged at the side of the electric motor 8 facing away from the hydraulic pump 7. The advantage of the two embodiments is that the additional pump 15, 30 is arranged axially to the drive shaft of the electric motor 7 and that the coupling of the drive means via a gear mechanism can be easily made. As the pump type for the pneumatic vacuum pump 15 a vane-cell pump is suited in a particularly advantageous manner, while the hydraulic pump 7 and the recharging pump 30 are designed as radial piston pumps or axial piston pumps in a known manner.

We claim:

1. An electronically controllable braking system for motor vehicles with a brake pressure generator unit which can be actuated by a brake pedal, which supplies hydraulic fluid via a hydraulic fluid path to at least one wheel brake of the motor vehicle, a first electromagnetic valve arrangement which is arranged in the hydraulic fluid path between the brake pressure generator unit and the wheel brake for controlling the pressure build-up, pressure relief and pressure holding phases in the wheel brake, a motor-powered controllable hydraulic pressure source which, in addition to or in lieu of the brake pressure generator unit, supplies hydraulic fluid to the wheel brake, and a motor-powered controllable auxiliary energy source which boosts an actuation of the brake pressure generator unit by the brake pedal or which effects an actuation of the brake pressure generator unit in lieu of the brake pedal, with the controllable auxiliary energy source and the controllable hydraulic pressure source being driven by the same motor and being continuously connected with same via a gear mechanism, and wherein the first valve arrangement and the motor are controlled by an electronic control unit during the operation of the braking system by means of corresponding control signals, characterized in that an inlet side and an outlet side of the controllable hydraulic pressure source can be brought to approximately the same pressure level, depending on the valve position of the first valve arrangement, at which the first valve arrangement is brought by control signals from the electronic control unit into a position which differs from the pressure build-up, pressure relief, or pressure holding phase.

2. The electronically controllable braking system for motor vehicles according to claim 1, wherein the controllable auxiliary energy source is a pneumatic pump which acts on a pneumatic brake booster which is coupled with the brake pressure generator unit.

3. The electronically controllable braking system for motor vehicles according to claim 2, wherein a second controllable valve arrangement is arranged between the pneumatic pump and the brake booster.

4. The electronically controllable braking system for motor vehicles according to claim 3, wherein the pneumatic pump is either connected with the brake booster, or an inlet side and an outlet side of the pneumatic pump can be brought to approximately the same pressure level, depending on the position of the second valve arrangement.

5. The electronically controllable braking system for motor vehicles according to claim 2, wherein the pneumatic pump is either connected with the brake booster, or an inlet side and an outlet side of the pneumatic pump can be brought to approximately the same pressure level, depending on the position of the second valve arrangement.

6. The electronically controllable braking system for motor vehicles according to claim 2, wherein the pneumatic pump is a vacuum pump which in particular is designed as a vane-cell pump.

7. The electronically controllable braking system for motor vehicles according to claim 2, wherein the motor comprises at least one output shaft and the hydraulic pressure source and the pneumatic pump each comprise one drive shaft, and wherein the output shaft and the two drive shafts are arranged coaxially to each other and rigidly connected with each other.

8. The electronically controllable braking system for motor vehicles according to claim 1, wherein the controllable auxiliary energy source is a hydraulic pump which acts on a cylinder/piston arrangement which is coupled with the brake pressure generator unit.

9. The electronically controllable braking system for motor vehicles according to claim 8, wherein a second controllable valve arrangement is arranged between the hydraulic pump and the cylinder/piston arrangement.

10. The electronically controllable braking system for motor vehicles according to claim 9, wherein the hydraulic pump is either connected with the cylinder/piston arrangement, or an inlet side and an outlet side of the hydraulic pump can be brought to approximately the same pressure level, depending on the position of the second valve arrangement.

11. The electronically controllable braking system for motor vehicles according to claim 10, wherein the hydraulic pump can be connected with a pressure accumulator, with at least one of the pressure accumulator and the hydraulic pump being connectable in a controlled manner with the cylinder/piston arrangement through a third valve arrangement.

12. The electronically controllable braking system for motor vehicles according to claim 11, wherein the brake pressure generator unit comprises at least one pressure chamber which is connectable with at least one wheel brake via the first valve arrangement, and comprises at least a second pressure chamber which is connectable with at least one of the hydraulic pump and the pressure accumulator via at least one of the second and the third valve arrangement.

13. The electronically controllable braking system for motor vehicles according to claim 12, wherein the motor comprises at least one output shaft and the hydraulic pump and the pneumatic or the hydraulic pump each comprise one drive shaft, and wherein the output shaft and the two drive shafts are arranged coaxially to each other and rigidly connected with each other.

14. The electronically controllable braking system for motor vehicles according to claim 13, wherein the pneumatic pump is a vacuum pump which in particular is designed as a vane-cell pump.

15. The electronically controllable braking system for motor vehicles according to claim 9, wherein the hydraulic pump can be connected with a pressure accumulator, with the pressure accumulator and/or the hydraulic pump being connectable in a controlled manner with the cylinder/piston arrangement through a third valve arrangement.

16. The electronically controllable braking system for motor vehicles according to claim 8, wherein the hydraulic pump is a pressure pump which in particular is designed as a radial piston pump or as an axial piston pump.

17. The electronically controllable braking system for motor vehicles according to claim 8, wherein the hydraulic pump is either connected with the cylinder/piston arrangement, or an inlet side and an outlet side of the hydraulic pump can be brought to approximately the same pressure level, depending on the position of the second valve arrangement.

18. The electronically controllable braking system for motor vehicles according to claim 8, wherein the hydraulic pump can be connected with a pressure accumulator, with the pressure accumulator and/or the hydraulic pump being connectable in a controlled manner with the cylinder/piston arrangement through a third valve arrangement.

19. The electronically controllable braking system for motor vehicles according to claim 8, wherein the hydraulic pump can be connected with a pressure accumulator, with the pressure accumulator and/or the hydraulic pump being connectable in a controlled manner with the cylinder/piston arrangement through a third valve arrangement.

20. The electronically controllable braking system for motor vehicles according to claim 8, wherein the motor comprises at least one output shaft and the hydraulic pressure source and the hydraulic pump each comprise one drive shaft, and wherein the output shaft and the two drive shafts are arranged coaxially to each other and rigidly connected with each other.

21. The electronically controllable braking system for motor vehicles according to claim 1, wherein a second controllable valve arrangement is arranged between the pneumatic pump and the brake booster.

22. The electronically controllable braking system for motor vehicles according to claim 1, wherein the pneumatic pump is either connected with the brake booster, or an inlet side and an outlet side of the pneumatic pump can be brought to approximately the same pressure level, depending on the position of the second valve arrangement.

* * * * *